United States Patent [19]

Schierbeek et al.

[11] Patent Number: 5,715,093
[45] Date of Patent: Feb. 3, 1998

[54] AUTOMATIC REARVIEW MIRROR SYSTEM WITH AUTOMATIC HEADLIGHT ACTIVATION

[75] Inventors: Kenneth L. Schierbeek, Zeeland; Niall R. Lynam, Holland, both of Mich.

[73] Assignee: Donnelly Corporation, Holland, Mich.

[21] Appl. No.: 768,193

[22] Filed: Dec. 17, 1996

Related U.S. Application Data

[63] Continuation of Ser. No. 277,674, Jul. 19, 1994, abandoned.

[51] Int. Cl.⁶ .................... G02F 1/15; G02F 1/153; G02B 21/00; G02B 5/08
[52] U.S. Cl. .................... 359/601; 359/602; 359/603; 359/604; 359/265; 359/273
[58] Field of Search .................... 359/601, 602, 359/603, 604, 265, 267, 273; 315/82, 149

[56] References Cited

U.S. PATENT DOCUMENTS

| | | | |
|---|---|---|---|
| 3,601,614 | 8/1971 | Platzer, Jr. | 250/206 |
| 3,963,940 | 6/1976 | Adamian | 315/10 LS |
| 4,097,778 | 6/1978 | Ludwig | 315/82 |
| 4,208,615 | 6/1980 | Jones et al. | 315/93 |
| 4,236,099 | 11/1980 | Rosenblum | 315/83 |
| 4,249,160 | 2/1981 | Chilvers | 340/33 |
| 4,301,390 | 11/1981 | Earle | 315/82 |
| 4,357,558 | 11/1982 | Massoni et al. | 315/83 |
| 4,443,057 | 4/1984 | Bauer et al. | 359/606 |
| 4,727,290 | 2/1988 | Smith et al. | 315/82 |
| 4,793,690 | 12/1988 | Gahan et al. | 359/604 |
| 4,831,310 | 5/1989 | Heintzberger et al. | 315/77 |
| 4,886,960 | 12/1989 | Molyneux et al. | 250/209 |
| 4,896,030 | 1/1990 | Miyaji | 250/201 |
| 4,896,075 | 1/1990 | Earle | 315/82 |
| 5,072,154 | 12/1991 | Chen | 315/82 |
| 5,124,549 | 6/1992 | Michaels et al. | 250/237 R |
| 5,148,014 | 9/1992 | Lynam et al. | 250/214 |
| 5,182,502 | 1/1993 | Slotkowski et al. | 315/159 |
| 5,193,029 | 3/1993 | Schofield et al. | 359/604 |
| 5,253,109 | 10/1993 | O'Farrell et al. | 359/604 |
| 5,451,822 | 9/1995 | Bechtel et al. | 307/9.1 |

FOREIGN PATENT DOCUMENTS

0426503A1  11/1990  European Pat. Off. .

*Primary Examiner*—Paul M. Dzierzynski
*Assistant Examiner*—Mohammad Y. Sikder
*Attorney, Agent, or Firm*—Van Dyke, Gardner, Linn & Burkhart, LLP

[57] ABSTRACT

A vehicle automatic rearview mirror system with headlight activation control for establishing a reflectivity level of an electrochromic rearview mirror element and for controlling the activated state of a vehicle's headlights includes two light sensors, an electrochromic mirror element drive circuit that is responsive to light to which the two light sensors are exposed for establishing a partial reflectivity level for the vehicle's electrochromic rearview mirror element, and a headlight activation control that is responsive to light to which the two light sensors are exposed for activating the vehicle's headlights under low light conditions and deactivating the vehicle's headlights under high light conditions. The two light sensors are preferably directionally sensitive and aimed in different directions, one aimed forward of the vehicle and the other aimed rearward of the vehicle. The headlights are preferably activated as a function of the lowest light level to which either of the light sensors is exposed.

33 Claims, 7 Drawing Sheets

AUTOMATIC REARVIEW MIRROR SYSTEM WITH AUTOMATIC HEADLIGHT ACTIVATION

This is a continuation of application Ser. No. 08/277,674 filed on Jul. 19, 1994, now abandoned.

BACKGROUND OF THE INVENTION

This invention relates generally to vehicle electronic control systems and, more particularly, to a control system for establishing the reflectivity level of a variable reflectivity rearview mirror and for activating the vehicle's headlights at dusk, or other appropriate light conditions, and deactivating the vehicle's headlights at dawn. More particularly, the invention utilizes common light sensors for establishing the reflectivity level of the mirror and for activating and deactivating the headlights.

Automatic rearview mirror systems, in which the reflectivity level of a variable reflectivity element is established as a function of light levels in the vicinity of the driver, typically include a first light sensor generally horizontally aimed forwardly of the vehicle and a second light sensor generally horizontally aimed rearwardly of the vehicle. The reflectivity level of the mirror is established as a function of the relationship of the light levels to which the forward and rear sensors are exposed.

Automatic headlight activating systems, which are also known as "twilight sentinels," activate the vehicle's headlights at dusk, or other appropriate light conditions, and deactivate the headlights at dawn as a function of light to which a single light sensor, which is directed upwardly in a vertical direction, is exposed. By pointing the light sensor in a non-horizontal orientation, an onerous difficulty is avoided. Namely, shortly before the sun sets at dusk, the sun is capable of producing a high light intensity. By orienting the light sensor in an automatic headlight activation system in a non-horizontal pointing direction, the sensor will not be influenced by the high intensity period shortly before the sun goes below the horizon, as could occur with a horizontally pointing sensor.

It is known to position the components of an automatic headlight activating system in the common housing of an automatic rearview mirror system. However, in prior art systems, separate light sensors are provided for control of the automatic rearview mirror and for control of headlight activation. It would be desirable to make combined use of the light sensors for economy of construction and design. However, there are difficulties in combining the functions of the light sensors. As previously set forth, the use of the horizontal light sensors of the automatic rearview mirror for operating the automatic headlight activation system is susceptible to the high light levels of the sun immediately before going below the horizon at dusk. It is also undesirable to use the upwardly aimed light sensor of the automatic headlight activating circuit as one of the light sensors operating the automatic rearview-mirror system. The relationship of the light upward of the vehicle to the light forward of, or rearward of, the vehicle is not considered meaningful in establishing the reflectivity level of the mirror. Perhaps for these reasons, the prior art suggestions and attempts have not resulted in any commercially successful automatic rearview mirror system with automatic headlight activation where a first light sensor, generally horizontally aimed forward of the vehicle, and a second light sensor, generally horizontally aimed rearwardly of the vehicle, is used both for control of the rearview mirror and for control of headlight activation.

SUMMARY OF THE INVENTION

The present invention makes combined use of light sensors in establishing the reflectivity level of a variable reflectivity rearview mirror, as well as activating the headlights of the vehicle at dusk, or other appropriate light conditions, and deactivating the headlights of the vehicle at dawn. This is accomplished in a manner which avoids the aforementioned difficulties, especially the susceptibility of horizontally aimed light sensors to the high intensity light of the sun immediately before going below the horizon at dusk and to other effects.

This is accomplished, according to the invention, by providing two light sensors, preferably directionally sensitive and most preferably aimed in different directions, and a control that is responsive to light to which the light sensors are exposed for controlling an automatic variable reflectance rearview mirror system and for controlling the vehicle's headlights. The headlights are preferably activated as a function of the lowest light level to which either of the light sensors is exposed. The light sensors may be substantially horizontally aimed with one light sensor aimed forwardly of the vehicle and the other aimed rearwardly of the vehicle. In this manner, the light sensors are utilized with a control for an automatic rearview mirror in order to establish the reflectivity level of a variable reflectivity element and for control of the vehicle's headlights so as to activate/deactivate automatically at dusk/dawn or whenever driving conditions benefit from such automatic headlight control.

In a preferred embodiment, the light sensors are electrically serially connected in a voltage divider circuit. The control for headlight activation is responsive to the current level in the voltage divider for activating the headlights. The control for the mirror is also responsive to the voltage level between the light sensors for establishing the reflectivity level of the reflective element. In alternative embodiments, circuits are provided for polling, or otherwise responding to, an electrical parameter of each of the light sensors. A control circuit responds to the electrical parameter of the light sensor exposed to the lowest light level, in order to activate the headlights. Also, the light sensors may be electrically interconnected in any manner that is deemed desirable for establishing the reflectivity level of the mirror such as is described, for example, in U.S. Pat. No. 4,443,057 to Bauer et al.

The present invention combines the light sensing functions of an automatic headlight activating system and an automatic rearview mirror system in a manner which does not adversely affect the operation of either. This is accomplished by utilizing light sensors appropriate for the operation of the automatic rearview mirror and, preferably, in a manner which is not adversely impacted by the high intensity of the setting sun. This may be accomplished by allowing the light sensor that is exposed to the darkest light level to dominate the operation of the automatic headlight activation control.

These and other objects, advantages, and features of this invention will become apparent upon review of the following specification in conjunction with the drawings.

DESCRIPTION OF THE PREFERRED EMBODIMENT

Figure 1:
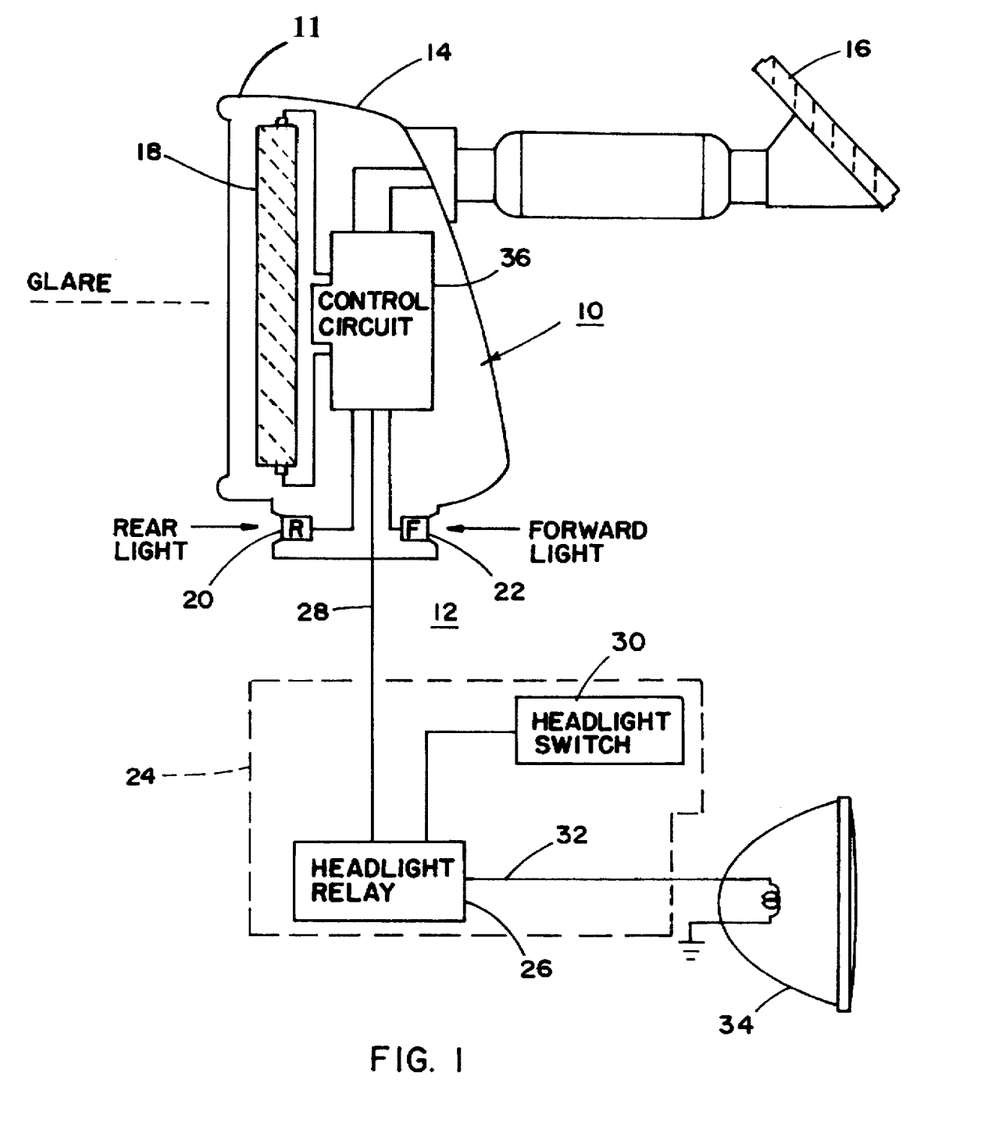
FIG. 1 is a block diagram illustrating a combined automatic rearview mirror and headlight activation system, according to the invention.

Referring now specifically to the drawings, and the illustrative embodiments depicted therein, a combined automatic rearview mirror and headlight activation system 10 for a vehicle 9 includes an electrical control system, generally shown at 12, mounted within a housing 14 of a rearview mirror 11 attached to a windshield 16 of a vehicle 9 (FIG. 1). Control system 12 includes a mirror reflectivity and headlight activation control 36, a variable reflectance mirror element 18, a substantially rearward-aiming light sensor 20, and a substantially forward-aiming light sensor 22, all positioned within the system assembly, such as in housing 14. In the preferred embodiment, mirror element 18 is an electrochromic element. Such electrochromic element may be either of the electrochemichromic type, such as is disclosed in U.S. Pat. No. 5,140,455 issued to Varaprasad et al. and commonly assigned with the present application, the disclosure of which is hereby incorporated herein by reference, or may be of the solid-state type, such as is disclosed in U.S. Pat. No. 4,712,879 issued to Lynam et al., U.S. patent application Ser. No. 08/023,675, filed Feb. 26, 1993, by Varaprasad et al. abandoned on May 4, 1994, U.S. patent application Ser. No. 08/193,557 filed Feb. 8, 1994, by Varaprasad et al. abandoned on Mar. 21, 1995, and U.S. patent application Ser. No. 08/238,521 filed Mar. 5, 1994, U.S. Pat. No. 5,668,663 by Varaprasad et al., all commonly assigned with the present application, and as disclosed in U.S. Pat. No. 4,671,619 issued to Kamimori et al., the disclosures of which are hereby incorporated herein by reference. Such electrochromic mirror elements are continuously variable and exhibit multiple partial reflectance states as the voltage applied thereto is varied.

Rear light sensor 20 is horizontally directionally aimed and mounted in order to sense light generally rearwardly of the vehicle. Forward light sensor 22 is also horizontally directionally aimed and mounted in order to sense light generally forward of the vehicle. In the illustrative embodiment, light sensors 20, 22 are cadmium sulfide photo-responsive resistors whose resistance is lowered as a non-linear function of increasing levels of light striking the sensor. However, any known sensor with an electrical characteristic that varies as a function of received light could be utilized for light sensors 20, 22. For example, photo-diodes, photo-voltaic cells, or the equivalent thereof may be utilized. Control system 12 additionally includes a headlight circuit 24 composed of a headlight relay 26, which receives a first input 28 from control circuit 36 and a second input from a headlight switch 30. Headlight relay 26 interconnects an output 32 thereof with a 12-volt battery, or ignition source (not shown), in order to supply activating power to a headlight 34. It should be understood that other configurations for headlight activation are possible. For example, headlight switch 30 could supply a control input to control circuit 36 whereby headlight relay 26 is under exclusive control of input 28. Also, output 32 could be used to switch the ground conductor of headlight 34 with the other terminal 34 connected directly with an activating voltage.

Figure 2:
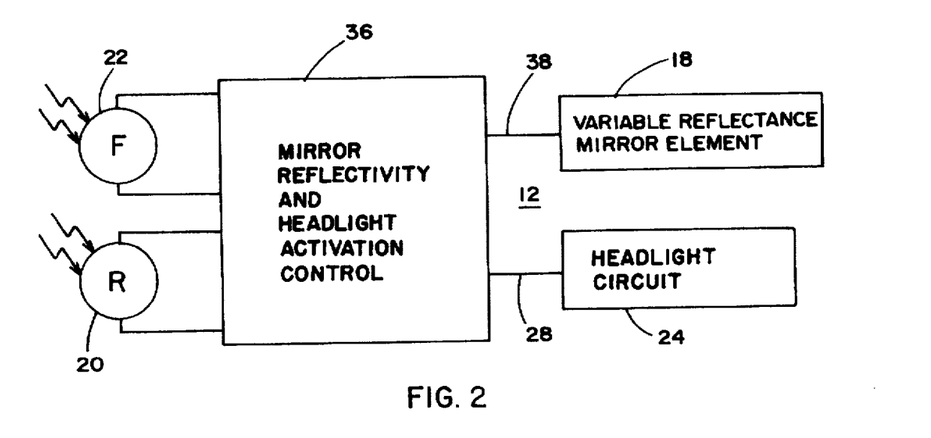
FIG. 2 is a block diagram of an electrical control for the system in FIG. 1.

Mirror reflectivity and headlight activation control circuit 36 responds to forward light sensor 22 and rearward light sensor 20 and produces an output signal 38, which provides a colorization signal to electrochromic mirror element 18, and output 28, which supplies an activation signal to headlight circuit 24 (FIG. 2). Mirror reflectivity and headlight activation control circuit 36 produces the coloration signal on output 38 as a function of the relationship between the light to which forward-facing sensor 22 is exposed and the light to Which rearward-facing sensor 20 is exposed. Numerous techniques are known in the art for producing a coloration signal for an electrochromic rearview mirror element as a function of the relationship of the light to which a forward and a rear sensor are exposed. All such techniques are considered encompassed by the present invention. Mirror reflectivity and headlight activation control circuit 36 produces input 28 to headlight circuit 24 in order to activate headlight 34 as a function that is dominated by the sensor 20, 22 that is exposed to the lowest light level. For example, if the vehicle is headed toward a setting sun that is just above the horizon, or other fixed light source, forward sensor 22 will receive a light level that may be several magnitudes greater than the light level to which rear sensor 20 is exposed. In such situation, the input on line 28 to headlight circuit 24 from control 36 will be dominated by the light level to which rear sensor 20 is exposed. Alternatively, if the vehicle is headed away from a setting sun, or other fixed light source, the light level to which rear sensor 20 is exposed may exceed the light level to which forward sensor 22 is exposed by several orders of magnitude. In such situation, input 28 supplied to headlight circuit 24 from control 36 will be dominated by the light level to which forward sensor 22 is exposed. In this manner, sensors 20, 22 and control circuit 36 form an omni-directional control system which is capable of determining light conditions under which it is desirable to activate headlight 34 irrespective of directional light sources. Headlight activation occurs when roadway driving light levels fall below a headlight activation threshold light level and deactivation occurs when roadway light levels exceed a headlight activation threshold light level. The headlight activation/deactivation threshold light level may be selected between 50 and 500 lux, depending upon the sensitivity setting of control circuit 36, and preferably within a range of 75–250 lux, with the most preferred range being between approximately 100 and approximately 150 lux. Alternatively, the headlight activation/deactivation threshold light level may be preset to be within the above ranges.

Figure 3:
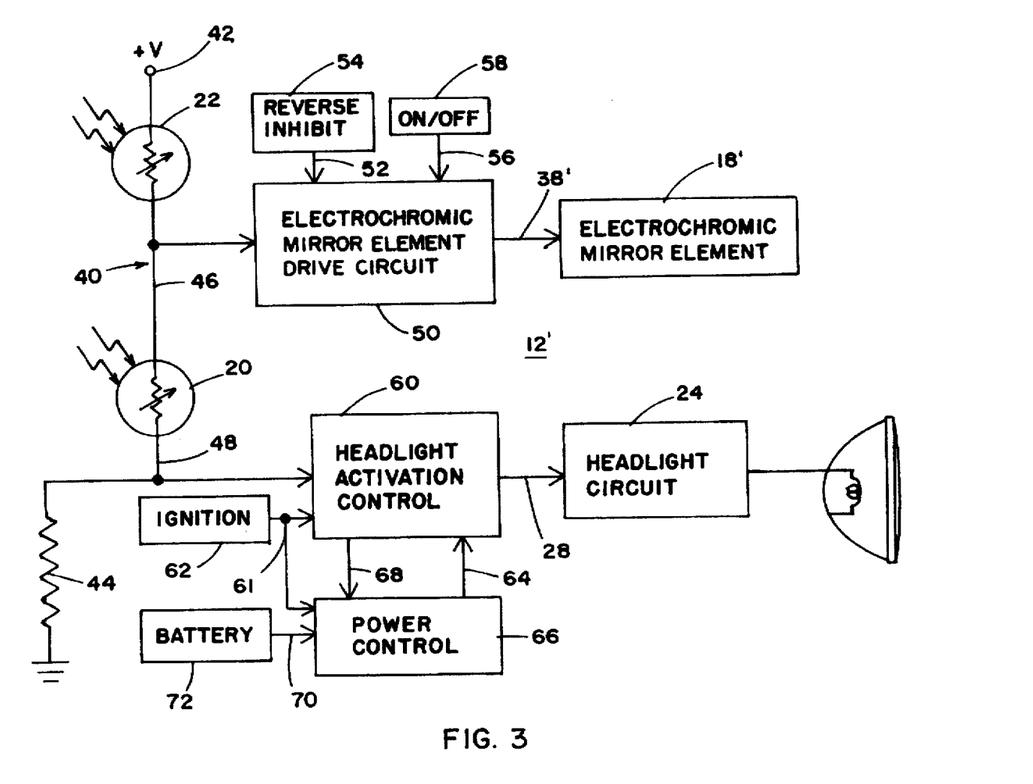
FIG. 3 is a combined schematic diagram and block diagram of an embodiment of the electrical control in FIG. 2.

A first embodiment of an electrical control system 12' includes a voltage divider 40 made up of a series connection of forward light sensor 22, rearward light sensor 20, and a fixed resistor 44 between a voltage source 42 and signal ground (FIG. 3). Light sensors 20 and 22 are joined at a node 46. Light sensor 20 and resistor 44 are joined at a node 48. Node 46 provides an input to an electrochromic mirror element drive circuit 50, which produces a coloration signal on output 38', which is supplied to an electrochromic mirror element 18'. Electrochromic mirror element drive circuit 50 additionally receives an input 52 from a reverse inhibit device 54, which may be a switching device that is responsive to the vehicle's gear shifter being placed in a reverse gear, in order to drive electrochromic cell 18' to a bleached condition, as is known in the art. Electrochromic drive circuit 50 may additionally receive an input 56 from an on/off switch 58, which is user operable in order to allow the driver to disable the automatic coloration of electrochromic mirror element 18'. Other inputs (not shown) to electrochromic drive circuit 50, such as a sensitivity select switch, may be provided.

Node 48 supplies an input to a headlight activation control 60. Headlight activation control 60 additionally receives an input 61 from the ignition circuit 62 of the vehicle in order to signal to headlight activation control 60 when the vehicle's ignition system is being activated. Headlight activation control 60 additionally receives DC power on an input 64 from a power control circuit 66. Power control circuit 66 receives an input 68 from headlight activation control 60 and receives supply voltage on an input 70 from the vehicle's battery circuit 72 and input 61 from the vehicle's ignition circuit 62. Headlight activation control 60 produces an output, which is provided as input 28 to headlight circuit 24.

Electrical control system 12' operates as follows. Forwardly aimed light sensor 22 and rearwardly aimed light sensor 20 each have an internal resistance, which varies in a non-linear, inverse proportion to the amount of light to which the respective sensor is exposed. Because sensors 20, 22 are electrically connected in a voltage divider configuration, the voltage at node 46 varies as a function of the relationship of light to which light sensors 20 and 22 are exposed. Thus, the greater the amount of light to which forward sensor 22 is exposed relative to the light to which rearward sensor 20 is exposed, the higher the voltage supplied to electrochromic drive circuit 50 from node 46. Likewise, the greater the amount of light to which rear light sensor 20 is exposed relative to the light to which forward sensor 22 is exposed, the lower the voltage supplied to electrochromic mirror element drive circuit 50 by node 46. Electrochromic mirror element drive circuit 50 processes the voltage level from node 46 to a level of the colorization signal on input 38 supplied to electrochromic minor element 18' in order to color the mirror element to a partial reflectivity level that is appropriate for relationship between the levels of light to which light sensors 20 and 22 are exposed. Resistor 44 is a sensitivity establishing device that affects the operation of the voltage divider 40 by limiting the decrease in the voltage on node 46 during conditions when both light sensors 20 and 22 are exposed to high light levels. In this manner, electrochromic mirror element drive circuit 50 will force coloration signal 38 to a bleach condition during conditions indicative of daylight, namely, when both sensors 20 and 22 are exposed to high lux levels.

The voltage on node 48, which is supplied as an input to headlight activation control 60, is a function of the relationship between the combined resistances of light sensors 20 and 22 and fixed resistor 44. Because the resistances of light sensors 20, 22 are in electrical series connection, their resistances are added together for the purposes of varying the voltage at node 48. Thus, if one of the two light sensors 20, 22 is exposed to a high light level and the other sensor is exposed to a low light level, the combined resistance of the two sensors will be determined primarily by the light sensor exposed to the low light level because it will have a high resistant value compared with the sensor exposed to the high light level. When the resistance of the two sensors is added together, the combined resistance will be approximately equal to the resistance of the sensor exposed to the lowest light level. In contrast, when both light sensors 20, 22 are exposed to high light levels, the combined resistances of the light sensors is relatively low. Although the combined resistances of light sensors 20 and 22 is higher when both light sensors are exposed to low light levels, the combined resistance will be no more than double that which occurs when only one light sensor 20, 22 is exposed to low light level. In contrast, when both light sensors 20, 22 are exposed to a high light level, the combined resistances of the light sensors may be several orders of magnitude lower than when one of the light sensors is exposed to a low light level. Because the light sensors 20, 22 are electrically connected in series with each other and the combination is connected in series with fixed resistor 44 at node 48, the voltage at node 48 will increase significantly when both light sensors 20, 22 are exposed to high light levels and will decrease significantly when one of the sensors 20, 22 is exposed to a low light level, indicative of a twilight or night condition or other low light condition, such as inclement weather, entering/exiting/driving within a road tunnel, and the like.

Headlight activation control 60 responds to a low signal level at node 48 by activating headlight circuit 24 through input 28. Headlight activation control 60 will only activate headlight circuit 24 when input 61 indicates that the vehicle's ignition circuit 62 is actuated, indicating that the vehicle is running. However, headlight activation control 60 is capable of continuing to activate headlight circuit 24 for a period of time after the vehicle ignition circuit 62 is de-energized in order to allow the user to safely exit the vehicle. This is accomplished as follows. Input 68 from headlight activation control 60 indicates whether headlight activation control 60 is activating headlight circuit 24. If not, power control 66 supplies power on line 64 to the headlight activation control only until the vehicle is turned off. If, however, input 68 from headlight activation control 60 indicates that headlight activation control 60 is activating headlight circuit 24, power control 66 will continue to produce a supply voltage on line 64, even after the vehicle is turned off, for a predetermined period of time, such as 30 seconds to about 3 minutes and, preferably, 1 to 2 minutes, or longer.

Figure 4:
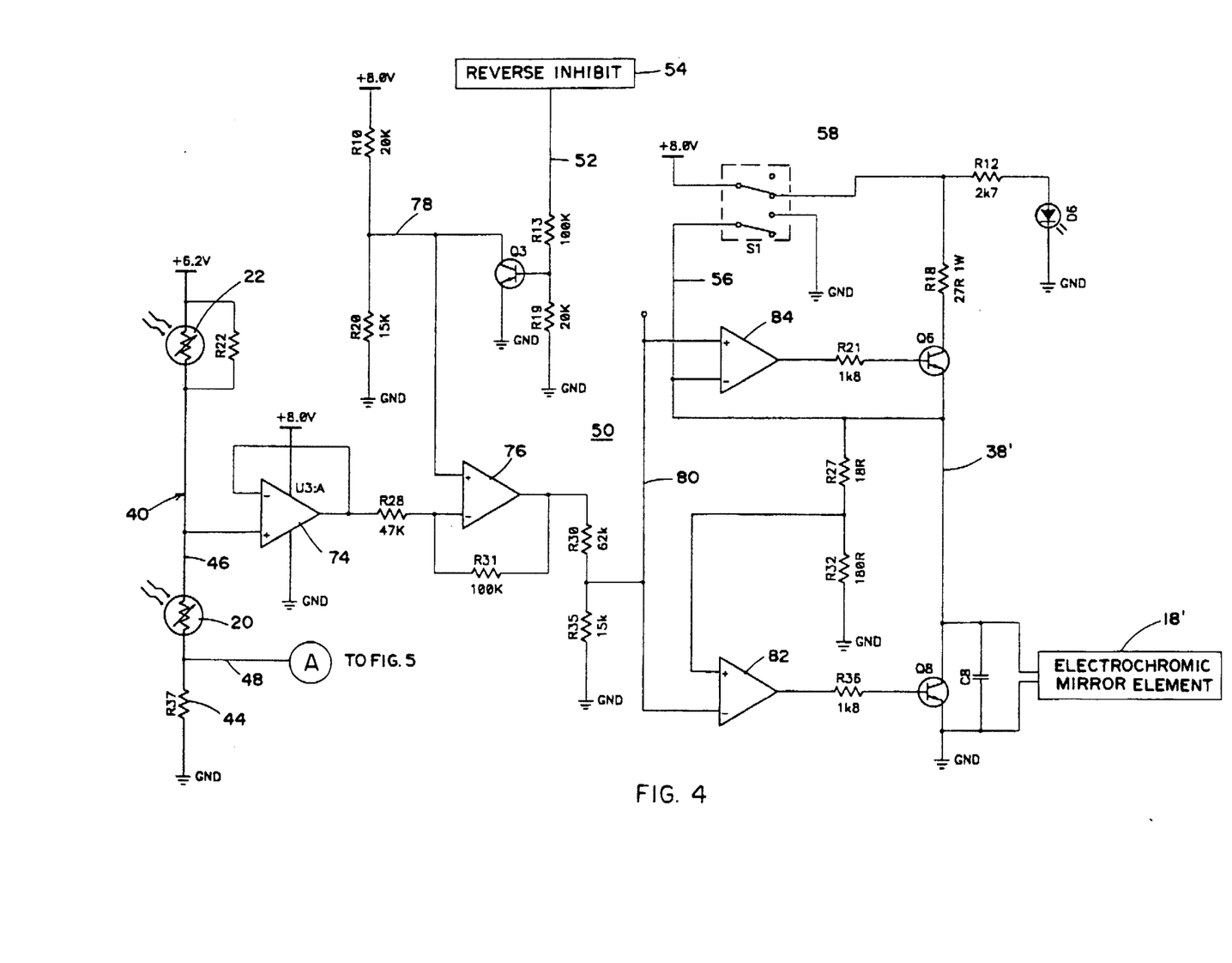
FIGS. 4, 5, and 6 are electrical schematic diagrams of the control in FIG. 3.

In the illustrated embodiment, electrochromic mirror element drive circuit 50 includes a buffer amplifier 74 having an inverting input connected in a unity-gain feedback loop and a non-inverting input connected with node 46 (FIG. 4). The output of amplifier 74 is supplied through a resistor R28 to the inverting input of an amplifier 76 whose gain is set at 2 by a feedback resistor R31 in combination with resistor R28. The non-inverting input of amplifier 76 is connected with a reference node 78, which is usually maintained at a fixed level by a voltage divider composed of resistors R10 and R20 in electrical series connection between an 8-volt source and ground. Reference node 78 may be selectively forced to a lower level by a transistor Q3 in response to a 12-volt reverse-inhibit signal supplied on input 52 from reverse inhibit circuit 54. The output of amplifier 76 is equal to the sum of the voltage at node 78 and twice the difference between the reference voltage at node 78 and the input voltage at node 46, provided that the reverse inhibit input 52 is not activated. If the reverse inhibit voltage 52 is activated, the output of amplifier 76 is clamped at ground.

The output of amplifier 76 is divided by a voltage divider composed of resistors R30 and R35, in order to match the output of amplifier 76 to the operating voltage range of electrochromic mirror element 18'. Resistors R30 and R35 are selected according to the type of electrochromic mirror element 18' being driven by drive circuit 50. The reduced voltage provided at a node 80 between resistors R30 and R35 is supplied to the inverting input of an amplifier 82 and to the non-inverting input of an amplifier 84. Because amplifiers 82 and 84 are not capable of supplying sufficient current to color and bleach electrochromic mirror element 18', the output of amplifier 82 is connected with the base of a transistor Q8 through a resistor R36 and the output of amplifier 84 is connected with the base of a transistor Q6 through a resistor R21. The collector of transistor Q6 is connected through a resistor R18 and switch 58 with an 8-volt power source. The emitter of a transistor Q6 is connected with the collector of transistor Q8 at output 38', which supplies the coloration voltage to electrochromic mirror element 18'. The emitter of transistor Q8 is grounded. Output 38' is additionally connected with the inverting input of amplifier 84 and is connected, through a voltage divider composed of resistors R27 and R32, to the inverting input of amplifier 82.

When the signal on node 80 increases above the voltage on output 38, amplifier 84 supplies a current to transistor Q6, which is driven into conduction, which causes the voltage on output 38' to rise to the level of the signal on node 80. In contrast, when the level of the signal on node 80 decreases below the voltage on output 38', amplifier 82 supplies a current to transistor Q8, which is placed into conduction, which lowers the voltage on output 38' until it equals the level of the signal at node 80. A hysteresis, or dead band, is established by the voltage divider composed of resistors R27 and R32 in order to prevent amplifiers 82, 84 from concurrently driving their respective transistors Q8, Q6. If on/off switch 58 is placed in an off condition, input 56 is grounded, which grounds output 38, and thereby forces electrochromic mirror element 18' into a bleach mode. An indicator D6 provides an indication when electrochromic cell 18' is being operated in an automatic mode.

Figure 5:
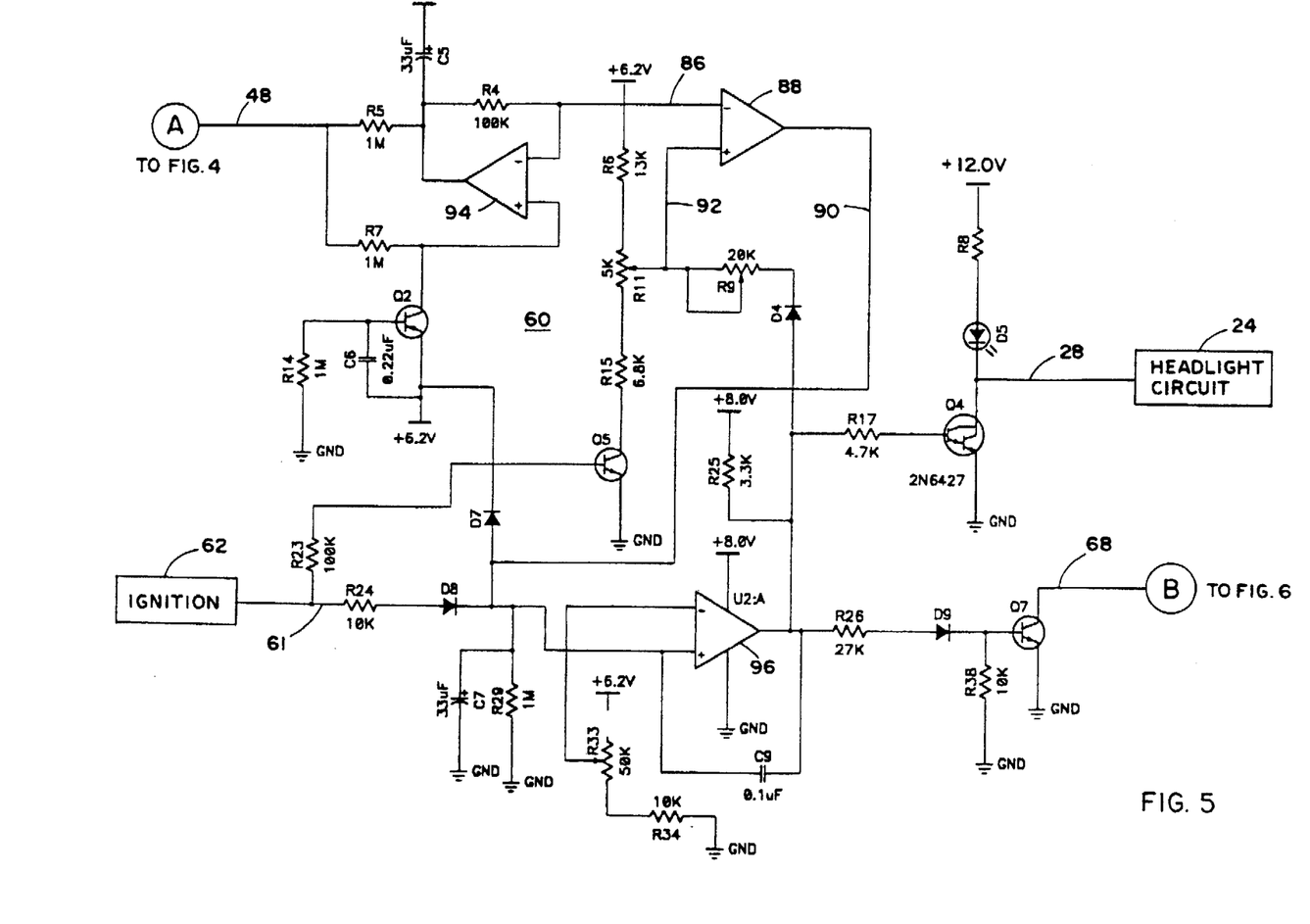

Headlight activation control 60 receives an omnidirectional light signal from node 48, which is filtered at a time constant of approximately 30 seconds (0.5 minutes) by a resistor R5 and capacitor C5 (FIG. 5). The filtered light signal is supplied on a line 86 to the inverting input of an open-collector comparator 88. Comparator 88 produces a short circuit on its output 90 if the voltage level at line 86 is above a reference 92 supplied to its non-inverting input. The omni-directional light signal on line 48 is filtered at an approximately 30-second time constant in order to avoid the influence of temporary light sources, such as the headlights of on-coming vehicles, overhead streetlights, and the like. In order to allow headlight activation control 60 to actuate the vehicle headlight circuit 24, under suitable sensed light conditions, upon start-up of the vehicle without having to wait for the 30-second time delay, a start-up override circuit is provided for temporarily disabling the time delay.

The start-up time-filter override circuit includes an open collector comparator 94 whose non-inverting input is connected with node 48, inverting input is connected with line 86, and output is connected with the junction between resistor R5 and capacitor C5. A resistor R4 is provided between the output of comparator 94 and line 86 in order to prevent the over-driving of comparator 88. When the vehicle is initially started, capacitor C5 is fully discharged so the voltage supplied to the inverting input of comparator 94 is greater than the voltage supplied to its non-inverting input from node 48. This causes comparator 94 to produce a short circuit on its output, which causes capacitor C5 to charge rapidly until the voltage on line 86 is equal to the voltage on node 48. At such time, comparator 94 switches its output to an open-circuit condition which allows normal operation of the time filter. In order to prevent comparator 94 from bypassing the time filter during normal operation of headlight activation control 60, a transistor Q2 is connected between the non-inverting input of comparator 94 and a 6.2-volt source. Upon turning on of the vehicle, a capacitor C6, connected between the 6.2-volt source and the base of transistor Q2, rapidly charges. When capacitor C6 is fully charged, transistor Q2 is switched to a conducting mode, after a suitable delay to allow the above-described charging of capacitor C5, which forces the non-inverting input of comparator 94 into a high state. Comparator 94 thereafter is inhibited from switching its output to a short circuit. In this manner, after the initial bypassing of the 30-second time filter during the turning on of the vehicle, the bypass circuit is disabled by transistor Q2 and its associated circuitry until the vehicle is turned off and then back on again.

Output 90 of comparator 88 is supplied to a junction between diodes D7 and D8 and the non-inverting input of a comparator 96. Comparator 96 receives a fixed reference voltage on its inverting input from a voltage divider composed of resistors R33 and R34. Although the reference voltage is illustrated as being adjustable by a potentiometer R33, the reference supplied to the inverting input of comparator 96 may also be fixed. Output 90 of comparator 88 is additionally connected to a parallel combination of a capacitor C7 and a resistor R29. Diode D8 is connected through a resistor R24 with ignition voltage circuit 62 on line 61. Line 61 is additionally connected through a resistor R23 with the base of a transistor Q5 whose emitter-collector junction is connected in series with resistors R6, R11, and R15. These resistors form a voltage divider between a voltage source of 6.2 volts and ground in order to supply the sensitivity signal on line 92 to the input of comparator 88. Resistor R11 is illustrated as a variable resistor, which may be adjustable by a user to select a sensitivity setting for automatic operation of the vehicle's headlights. Alternatively, resistor R11 could be fixed.

Figure 6:
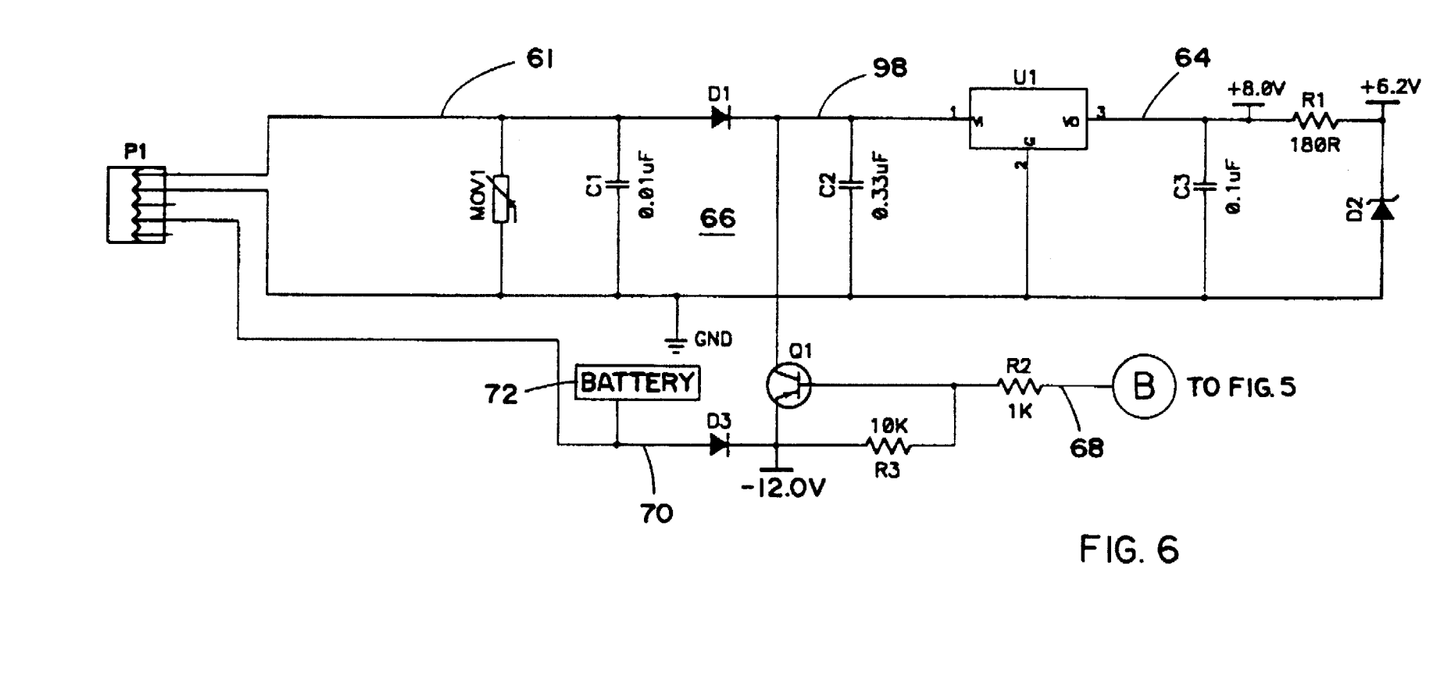

The output of comparator 96 is connected through a pull-up resistor R25 to an 8.0-volt source and a through a diode D4 and a resistor R9 to sensitivity line 92. The output of comparator 96 is additionally supplied to the base of a Darlington pair Q4, which, when supplied a based drive signal through a resistor R17, will sink a current through headlight circuit 24 in order to actuate headlight 34. The output of comparator 96 is additionally connected, through a resistor R26 and a diode D9, to the base of a transistor Q7, which selectively supplies a base drive through a resistor R2 to a transistor Q1 (FIG. 6). Transistor Q1 is connected through a diode D3 to a line 70 supplied with battery voltage from battery circuit 72 and to the input 98 of a voltage regulator U1. The output 64 of voltage regulator U1 supplies regulated DC voltage for operation of all of the circuits of headlight activation control 60. When the vehicle is in operation, input 98 of a voltage regulator U1 is supplied from ignition line 61 through a diode D1. When the vehicle is turned off, line 61 is no longer energized. Input 98 to U1 will, nonetheless, be energized after the vehicle has been turned off if transistor Q1 is driven into conduction by output 68 of the headlight activation control 60. When transistor Q1 is in conduction, the battery voltage on line 70 is supplied to diode D3 and transistor Q1 to input 98 of voltage regulator U1.

In operation, when the voltage on input 86 of comparator 88 is greater than the sensitivity reference on line 92, indicative of a light condition under which it is desired that headlights 34 not be activated, output 90 is driven to ground by comparator 88. With output 90 grounded, the non-inverting input of comparator 96 is below the reference established on its inverting input, which switches its output to a short circuit state, which pulls the voltage on its output line to ground. This condition is in response to the omnidirectional light signal on input 48 being at a relatively high voltage level in response to both of the light sensors 20, 22 sensing high light levels. Accordingly, in response to high light levels, there is no drive signal supplied to transistor Q4 and transistor Q4 is open-circuited. This produces a high impedance condition on line 28, which headlight circuit 24 responds to by deactivating the headlights. Likewise, the low voltage on the output of comparator 96 removes the drive to transistor Q7, which becomes open-circuited, which removes the drive from transistor Q1, which also becomes open-circuited. In this manner, if the vehicle is turned off when the output of comparator 96 is pulled to ground, power will be removed from headlight activation control 60 because voltage regulator U1 will not receive an input voltage on line 98 from either battery circuit 72 or ignition circuit on line 61.

When the voltage on line 86 drops below the sensitivity reference on line 92, indicative of one or both of the light sensors 20, 22 sensing low light levels, the output of comparator 90 becomes open-circuited and is pulled to 7 volts through diode D8 and resistor R24 connected to ignition source 62. This forces the non-inverting input of comparator 96 above the reference on its inverting input, which switches its output into an open-circuit condition. The output of comparator 96 is pulled high through pull-up resistor R25 connected to 8.0 volts, which switches transistor Q4 into a conductive state, which pulls output 28 to ground. Headlight circuit 24 responds by activating the headlights. Furthermore, an indicator D5 is illuminated from a 12.0-volt source in order to advise the driver that the headlights are activated. The positive voltage at the output of comparator 96, when the headlights are activated, is fed through a diode D4 and resistor R9 to the sensitivity reference level supplied to the non-inverting input of comparator 88. This provides hysteresis by raising the threshold for comparator 88 when the headlights are activated to prevent rapid deactivation.

The high signal on the output of comparator 96 when the headlights are activated is additionally supplied to the base of transistor Q7, driving it into conduction, which also forces transistor Q1 into conduction. With transistor Q1 in conduction, voltage regulator U1 will be supplied with an input voltage from battery circuit 72 through diode D3 and transistor Q1 even after the vehicle is turned off to retain power supply to headlight activation control 60 in order to allow continued actuation of the lights for a predetermined period. Furthermore, the removal of ignition voltage from line 61 when the vehicle is turned off will cause transistor Q5 to be open-circuited, which will cause the sensitivity reference on line 92 to be pulled up to supply voltage 6.2 volts. This will cause comparator 88 to be forced to an open-circuit output, which will continue to activate the headlights when the vehicle is turned off, for the duration that transistor Q7 and Q1 are conducting and thereby supplying voltage to headlight activation control 60. After the vehicle has been turned off and ignition voltage is removed from line 61, capacitor C7 will discharge through resistor R29, which will gradually pull the non-inverting input of comparator 96 towards ground. When the voltage across capacitor C7 drops below the reference level supplied to the inverting input of comparator 96, the output of comparator 96 will switch low, which will deactivate headlight circuit 26 and cause transistors Q7 and Q1 to become open-circuited, which will remove power from the headlight activation control circuit 60. In this manner, headlight activation control 60 does not draw power from the vehicle's battery when the vehicle is turned off except for a brief period when the headlights are maintained activated after the vehicle is turned off.

Figure 7:
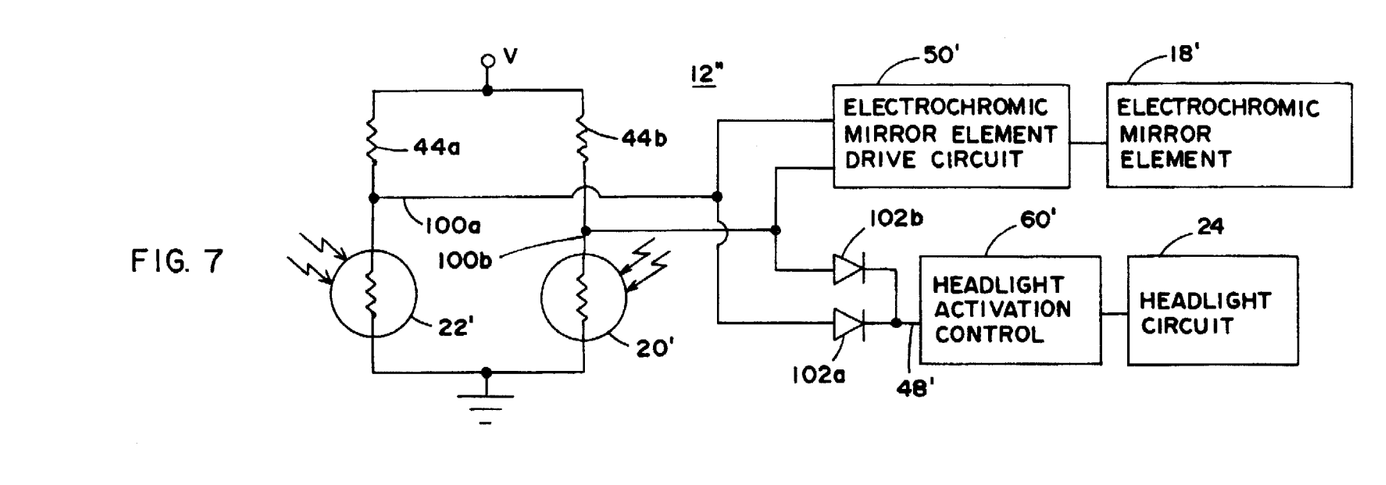
FIG. 7 is a combined electrical schematic and block diagram of an alternative embodiment of an electrical control, according to the invention.
Figure 8:
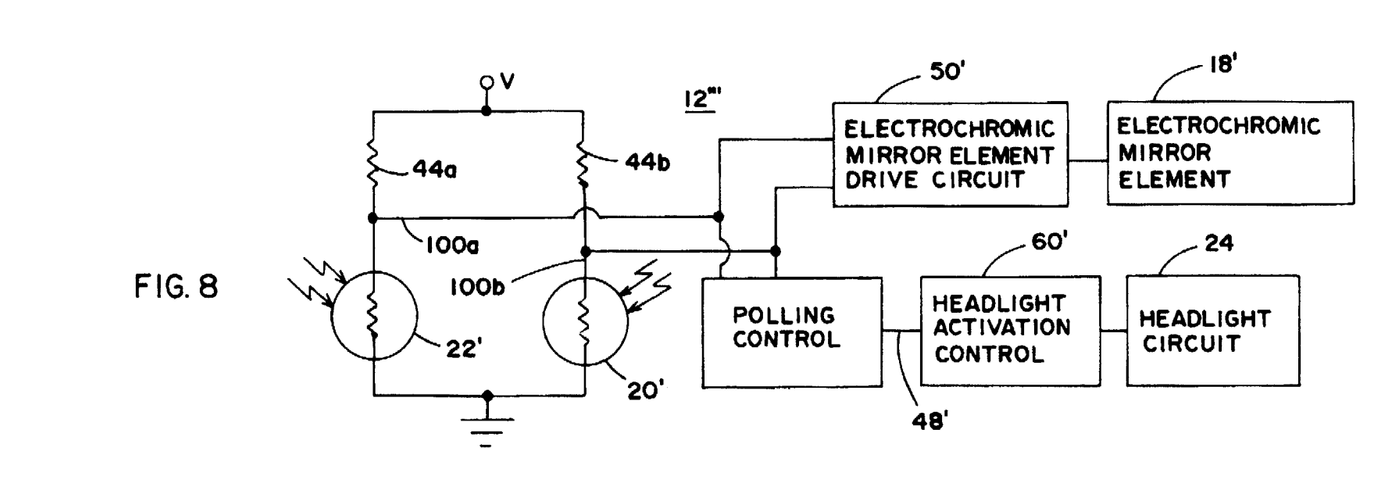
FIG. 8 is a combined electrical schematic and block diagram of another alternative embodiment of an electrical control, according to the invention.
Figure 9:
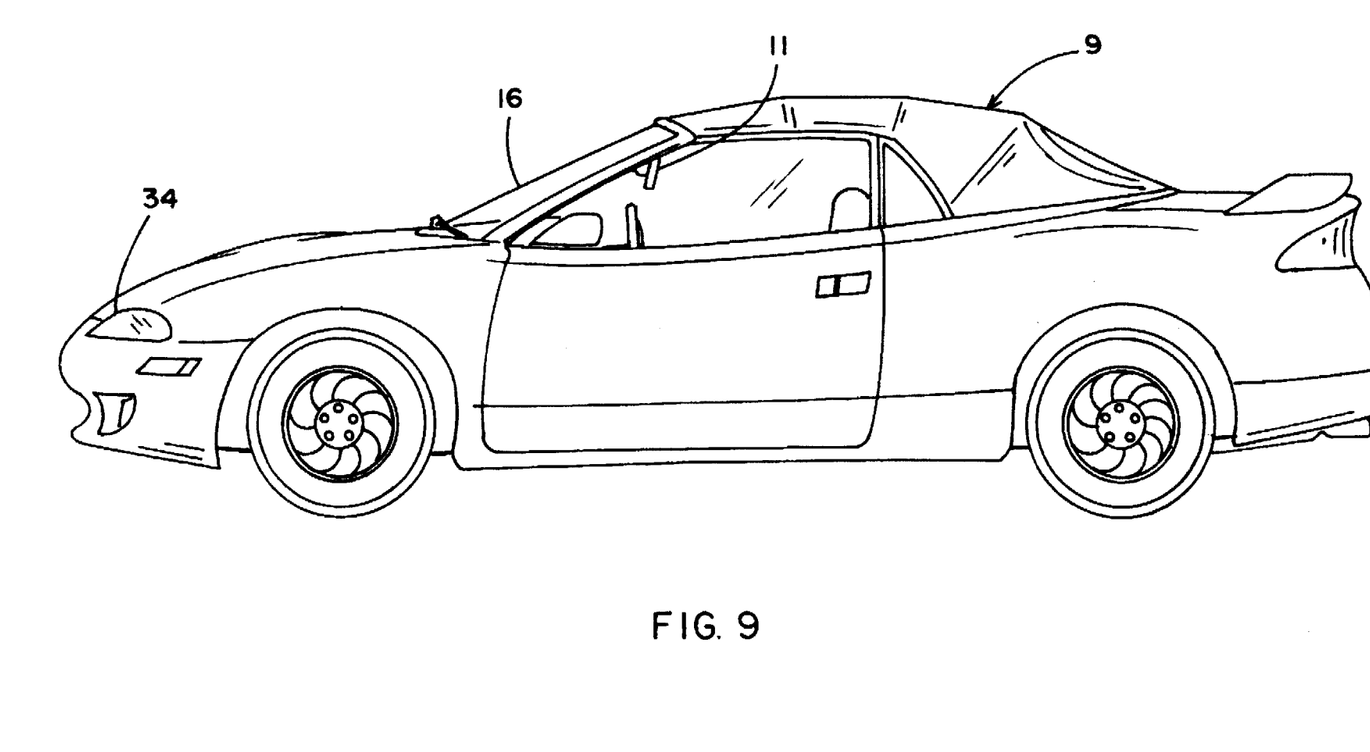
FIG. 9 is a side elevation of a vehicle incorporating the invention.

In a first alternative embodiment, an electronic control system 12" includes a forward light sensor 22' and a rear light sensor 20' which are connected in a bridge circuit with respective biasing resistors 44a and 44b (FIG. 7). In electrical control system 12", separate inputs are supplied to electrochromic drive circuit 50' from the respective nodes 100a between light sensor 22' and resistor 44a and 100b between light sensor 20' and resistor 44b. Node 100a is supplied through a diode 102a to an input 48' of a headlight activation control 60'. Node 100b is supplied through a second diode 102b to the input 48' of headlight activation control 60'. The voltages on nodes 100a and 100b will increase in response to the respective light sensor 20', 22' being exposed to a low light level. The reason is that the one of the sensors 20', 22' exposed to a lower light level will have a higher resistance, which will increase the voltage at the respective node between it and its biased resistor. Accordingly, the voltage at node 100a, 100b associated with the sensor 20', 22' exposed to the lowest light level will control the voltage at input 48' through its respective diode 102a, 102b, reverse biasing the diode of the node 100a, 100b connected with the sensor 20', 22' exposed to a higher light level. In a second alternative embodiment, an electrochromic control system 12'" includes a polling control 104 which is provided with inputs from nodes 100a, 100b (FIG. 8). Polling control 104 periodically polls nodes 100a, 100b with the voltage associated with the light sensor exposed to the lowest light level retained between polling, by a sample and hold circuit included with polling control 104. Other variations will suggest themselves to those of ordinary skill in the art.

Changes and modifications in the specifically described embodiments can be carried out without departing from the principles of the invention. For example, although the invention is described as selecting between activation and deactivation of a vehicle's headlights, it could be used to change the headlight activation between a high-wattage nighttime filament and a low-wattage daytime running light filament or between headlight activation and separate daytime running light activation. Within the context of this patent, activation or deactivation means going from headlights being on to headlights being off, or going from headlights being on to a daytime running light condition. Although the light sensors are illustrated as aimed outwardly of the vehicle, they may be aimed in other directions and may be directed through electrochromic mirror element 18. The protection afforded the invention is intended to be limited only by the scope of the appended claims, as interpreted according to the principles of patent law including the doctrine of equivalents.

The embodiments of the invention in which an exclusive property or privilege is claimed are defined as follows:

1. A vehicle automatic rearview mirror system with headlight activation control for establishing a reflectivity level of an electrochromic rearview mirror element and for activating a vehicle's headlights at low light conditions and deactivating the vehicle's headlights at high light conditions, comprising:

two light sensors;

an electrochromic mirror element drive circuit and a headlight activation control circuit which commonly respond to both said light sensors;

said electrochromic mirror element drive circuit being responsive to light to which both said light sensors are exposed for establishing a partial reflectivity level for the vehicle's electrochromic rearview mirror element; and said headlight activation control being responsive to light to which both said light sensors are exposed for activating the vehicle's headlights under low light conditions and deactivating the vehicle's headlights under high light conditions.

2. The system in claim 1 wherein said light sensors are directionally sensitive.

3. The system in claim 2 wherein said light sensors are aimed in different directions.

4. The system in claim 3 wherein said light sensors are aimed in a substantially horizontal direction.

5. The system in claim 4 wherein one of said light sensors is aimed substantially forwardly of said vehicle and the other one of said light sensors is aimed substantially rearwardly of said vehicle.

6. The system in claim 1 wherein said headlight activation control activates the vehicle's headlights as a function of the lowest light level to which either of the light sensors is exposed.

7. The system in claim 1 wherein said light sensors, drive circuit and said control are commonly housed with a rearview mirror in a passenger compartment of the vehicle.

8. The system in claim 7 wherein said rearview mirror is an electrochromic mirror element having a continuously variable reflectivity level and wherein said light sensors are commonly used to establish a reflectivity level for said mirror.

9. The system in claim 1 wherein said deactivating the vehicle's headlights includes deactivating to a daytime running light condition.

10. A vehicle automatic rearview mirror system with headlight activation control for establishing a reflectivity level of an electrochromic rearview mirror element and for activating a vehicle's headlights at low light conditions and deactivating the vehicle's headlights at high light conditions, comprising:

two light sensors;

an electrochromic mirror element drive circuit that is responsive to light to which said light sensors are exposed for establishing a partial reflectivity level for the vehicle's electrochromic rearview mirror element; and a headlight activation control that is responsive to light to which said light sensors are exposed for activating the vehicle's headlights under low light conditions and deactivating the vehicle's headlights under high light conditions;

wherein said light sensors are electrically serially connected in a voltage divider.

11. The system in claim 10 wherein said drive circuit is responsive to the voltage between said light sensors for establishing the reflectivity level of the vehicle's electrochromic rearview mirror element.

12. The system in claim 10 wherein said control is responsive to the current level in said voltage divider for activating the vehicle's headlights.

13. The system in claim 10 including a resistor serially connected with said light sensors in said voltage divider and wherein said control is responsive to the voltage across said resistor for activating the vehicle's headlights.

14. A vehicle automatic rearview mirror system with headlight activation control for establishing a reflectivity level of an electrochromic rearview mirror element and for activating a vehicle's headlights at low light conditions and deactivating the vehicle's headlights at high light conditions, comprising:

two light sensors;

an electrochromic mirror element drive circuit that is responsive to light to which said light sensors are exposed for establishing a partial reflectivity level for the vehicle's electrochromic rearview mirror element; and a headlight activation control that is responsive to light to which said light sensors are exposed for activating the vehicle's headlights under low light conditions and deactivating the vehicle's headlights under high light conditions;

wherein said headlight activation control includes a polling circuit that samples an electrical parameter of each of said light sensors and holds said electrical parameter of the one of said light sensors exposed to the lowest light level, for activating the vehicle's headlights.

15. A combined automatic rearview mirror system that varies the level of light reflected by an electrochromic rearview mirror to the driver of the vehicle as a function of light levels in the vicinity of said driver and an automatic headlight activation system for activating the vehicle's headlights at dusk and deactivating the vehicle's headlights at dawn, comprising:

an electrochromic rearview mirror element having a continuously variable reflectivity that responds to an electrical signal by coloring to a partial reflectance level;

two light sensors; and a control circuit, including an electrochromic mirror element drive circuit and a headlight activation control circuit which commonly responds to light to which both said light sensors are exposed, said headlight activation control circuit activating and deactivating the vehicle's headlights as a function of the lowest level of light sensed between said sensors is exposed, said electrochromic mirror element drive circuit establishing a reflectivity level of said mirror element as a function of the relationship of the levels of light to which said both light sensors are exposed.

16. The combined system in claim 15 wherein said light sensors are directionally sensitive.

17. The combined system in claim 16 wherein said light sensors are aimed in different directions.

18. The combined system in claim 17 wherein said light sensors are aimed in a substantially horizontal direction.

19. The combined system in claim 18 wherein one of said light sensors is aimed substantially forwardly of said vehicle and the other one of said light sensors is aimed substantially rearwardly of said vehicle.

20. The combined system in claim 15 wherein said light sensors, said control circuit and said mirror element are commonly housed in a rearview mirror housing in a passenger compartment of the vehicle.

21. A combined automatic rearview mirror system that varies the level of light reflected by an electrochromic rearview mirror to the driver of the vehicle as a function of light levels in the vicinity of said driver and an automatic headlight activation system for activating the vehicle's headlights at dusk and deactivating the vehicle's headlights at dawn, comprising:

an electrochromic rearview mirror element having a continuously variable reflectivity that responds to an electrical signal by coloring to a partial reflectance level;

two light sensors; and a control circuit that is responsive to light to which said light sensors are exposed for activating and deactivating the vehicle's headlights as a function of the lowest level of light to which either of said sensors is exposed and for establishing a reflectivity level of said mirror element as a function of the relationship of the levels of light to which said light sensors are exposed;

wherein said light sensors are electrically serially connected in a voltage divider and said control circuit is responsive to the current level in said voltage divider for activating said headlights and is responsive to the voltage between said light sensors for establishing the reflectivity level of said element.

22. The combined system in claim 21 including a resistor serially connected with said light sensors in said voltage divider and a junction between said light sensors and wherein said control is responsive to the voltage across said resistor for activating said headlights and is responsive to the voltage at said junction for establishing the reflectivity level of said element.

23. A combined automatic rearview mirror system that varies the level of light reflected by an electrochromic rearview mirror to the driver of the vehicle as a function of light levels in the vicinity of said driver and an automatic headlight activation system for activating the vehicle's headlights at dusk and deactivating the vehicle's headlights at dawn, comprising:

an electrochromic rearview mirror element having a continuously variable reflectivity that responds to an electrical signal by coloring to a partial reflectance level;

two light sensors; and a control circuit that is responsive to light to which said light sensors are exposed for activating and deactivating the vehicle's headlights as a function of the lowest level of light to which either of said sensors is exposed and for establishing a reflectivity level of said mirror element as a function of the relationship of the levels of light to which said light sensors are exposed;

wherein said control includes a polling circuit that samples an electrical parameter of each of said light sensors and holds said electrical parameter of the one of said light sensors exposed to the lowest light level, for activating said headlights.

24. A combined automatic rearview mirror system that varies the level of light reflected by an electrochromic rearview mirror to the driver of the vehicle as a function of light levels in the vicinity of said driver and an automatic headlight activation system for activating the vehicle's headlights at dusk and deactivating the vehicle's headlights at dawn, comprising:

an electrochromic rearview mirror element having a continuously variable reflectivity that responds to an electrical signal by coloring to a partial reflectance level;

two light sensors; and a control circuit that is responsive to light to which said light sensors are exposed for activating and deactivating the vehicle's headlights as a function of the lowest level of light to which either of said sensors is exposed and for establishing a reflectivity level of said mirror element as a function of the relationship of the levels of light to which said light sensors are exposed:

wherein said deactivating the vehicle's headlights includes deactivating to a daytime running light condition.

25. In a vehicle having headlights and a rearview mirror including an electrochromic mirror element having a continuously variable reflectivity that responds to an electrical signal by coloring to a partial reflectance level, a method of establishing the reflectivity level of the mirror as a function of light levels in the vicinity of the driver and for activating the vehicle's headlights at dusk and deactivating the vehicle's headlights at dawn, including:

providing two light sensors;

sensing light levels from said vehicle in two directions with said two light sensors; and responding to the light sensed by both said two light sensors and activating and deactivating the vehicle's headlights as a function of the lowest light level sensed between said two light sensors and establishing the reflectivity level of said electrochromic mirror element as a function of the relationship of the light levels sensed by both of said light sensors.

26. The method of claim 25 wherein said sensing of light levels includes responding to an electrical parameter of each of said light sensors.

27. The method in claim 26 wherein said light sensors are aimed in different directions.

28. The method of claim 27 wherein said light sensors are aimed in substantially horizontal directions.

29. The method of claim 26 wherein said providing includes aiming one of said light sensors substantially forwardly of said vehicle and the other one of said light sensors substantially rearwardly of said vehicle.

30. In a vehicle having headlights and a rearview mirror including an electrochromic mirror element having a continuously variable reflectivity that responds to an electrical signal by coloring to a partial reflectance level, a method of establishing the reflectivity level of the mirror as a function of light levels in the vicinity of the driver and for activating the vehicle's headlights at dusk and deactivating the vehicle's headlights at dawn, including:

sensing light levels from said vehicle in two directions including providing a pair of light sensors and responding to an electrical parameter of each of said light sensors; and activating and deactivating the vehicle's headlights as a function of the lowest light level sensed in said two directions and establishing the reflectivity level of said element as a function of the relationship of the light levels sensed in said two directions;

wherein said light sensors are electrically serially connected in a voltage divider and wherein said activating said headlights includes responding to the current level in said voltage divider and wherein said establishing the reflectivity level of said element includes responding to the voltage between said light sensors.

31. The method of claim 30 including providing a junction between said light sensors and a resistor that is electrically serially connected with said light sensors, and responding to the voltage across said resistor to activate said headlights and the voltage at said junction to establish the reflectivity level of said element.

32. In a vehicle having headlights and a rearview mirror including an electrochromic mirror element having a continuously variable reflectivity that responds to an electrical signal by coloring to a partial reflectance level, a method of establishing the reflectivity level of the mirror as a function of light levels in the vicinity of the driver and for activating the vehicle's headlights at dusk and deactivating the vehicle's headlights at dawn, including:

sensing light levels from said vehicle in two directions including providing a pair of light sensors and responding to an electrical parameter of each of said light sensors; and activating and deactivating the vehicle's headlights as a function of the lowest light level sensed in said two directions and establishing the reflectivity level of said element as a function of the relationship of the light levels sensed in said two directions;

polling said light sensors by sampling an electrical parameter of each of said light sensors and responding to said electrical parameter of the one of said light sensors exposed to the lowest light level to activate said headlights and responding to the relationship between said electrical parameter of each of said light sensors to establish the reflectivity level of said element.

33. In a vehicle having headlights and a rearview mirror including an electrochromic mirror element having a continuously variable reflectivity that responds to an electrical signal by coloring to a partial reflectance level, a method of establishing the reflectivity level of the mirror as a function of light levels in the vicinity of the driver and for activating the vehicle's headlights at dusk and deactivating the vehicle's headlights at dawn, including:

sensing light levels from said vehicle in two directions; and activating and deactivating the vehicle's headlights as a function of the lowest light level sensed in said two directions and establishing the reflectivity level of said element as a function of the relationship of the light levels sensed in said two directions;

wherein said deactivating the vehicle's headlights includes deactivating to a daytime running light condition.

* * * * *

UNITED STATES PATENT AND TRADEMARK OFFICE
CERTIFICATE OF CORRECTION

PATENT NO. : 5,715,093
DATED : February 3, 1998
INVENTOR(S) : Kenneth L. Schierbeek and Niall R. Lynam It is certified that error appears in the above-identified patent and that said Letters Patent is hereby corrected as shown below:

Column 1,
Line 43, "minor" should be -- mirror --.

Column 3,
Line 20, "minor" should be -- mirror --.

Column 4,
Line 16, "Which" should be -- which --.

Column 5,
Line 39, "minor" should be -- mirror --.

Column 10, claim 1,
Line 62, delete "two light sensors" and insert therefor -- a light sensor combination consisting of a first light sensor and a second light sensor --.
Line 65, delete "both said light sensors" and insert therefor -- said light sensor combination --.
Line 67, delete "both".
Line 67, delete "sensors are" and insert therefor -- sensor combination is --.

Column 11, claim 1,
Line 4, after "responsive to" insert -- the same --.
Line 5, delete "both"
Line 5, delete "sensors are" and insert therefor-- sensor combination is --.

Column 11, claim 7,
Line 23, delete "sensors" and insert therefor -- sensor combination --.
Line 23, before "drive" insert -- said electrochromic mirror element --.
Line 24, after "said" insert -- headlight activation --.

Column 11, claim 8,
Lines 26-30, delete claim 8, lines 26-30, in its entirety.

UNITED STATES PATENT AND TRADEMARK OFFICE
CERTIFICATE OF CORRECTION

PATENT NO. : 5,715,093  
DATED : February 3, 1998  
INVENTOR(S) : Kenneth L. Schierbeek and Niall R. Lynam Page 2 of 3

It is certified that error appears in the above-identified patent and that said Letters Patent is hereby corrected as shown below:

Column 11,  
Line 31, "9." should be -- 8. --.  
Line 34, "10." should be -- 9. --.  
Line 54, "11." should be -- 10. --.  
Line 54, "in claim 10" should be -- in claim 9 --.  
Line 58, "12." should be -- 11.--.  
Line 58, "in claim 10" should be -- in claim 9 --.  
Line 61, "13." should be -- 12. --.  
Line 61, "in claim 10" should be -- in claim 9 --.  
Line 65, "14." should be -- 13. --.

Column 12,  
Line 20, "15." should be -- 14. --.  
Line 43, "16." should be -- 15. --.  
Line 43, "in claim 15" should be -- in claim 14 --.  
Line 45, "17." should be -- 16.--.  
Line 45, "in claim 16" should be -- in claim 15 --.  
Line 47, "18." should be -- 17.--.  
Line 47, "in claim 17" should be -- in claim 16 --.  
Line 49, "19." should be -- 18. --.  
Line 49, "in claim 18" should be -- in claim 17 --.  
Line 53, "20." should be -- 19. --.  
Line 53, "in claim 15" should be -- in claim 14 --.  
Line 57, "21." should be -- 20. --.

Column 13,  
Line 14, "22." should be -- 21. --.  
Line 14, "in claim 21" should be -- in claim 20 --.  
Line 21, "23." should be -- 22. --.  
Line 45, "24." should be -- 23. --.  
Line 62, "exposed:" should be -- exposed; --.  
Line 66, "25." should be -- 24. --.

UNITED STATES PATENT AND TRADEMARK OFFICE
CERTIFICATE OF CORRECTION

PATENT NO. : 5,715,093
DATED : February 3, 1998
INVENTOR(S) : Kenneth L. Schierbeek and Niall R. Lynam

It is certified that error appears in the above-identified patent and that said Letters Patent is hereby corrected as shown below:

Column 14,
Line 16, "26." should be -- 25. --.
Line 16, "of claim 25" should be -- of claim 24 --.
Line 19, "27." should be -- 26. --.
Line 19, "in claim 26" should be -- in claim 25 --.
Line 21, "28."should be -- 27. --.
Line 21, "of claim 27" should be -- of claim 26 --.
Line 23, "29." should be -- 28. --.
Line 23, "of claim 26" should be -- of claim 25 --.
Line 27, "30." should be -- 29. --.
Line 50, "31." should be -- 30. --,
Line 50, "of claim 30" should be --of claim 29--.
Line 56, "32." should be -- 31. --.

Column 15,
Line 13, "33." should be -- 32. --.

Signed and Sealed this

Eighteenth Day of December, 2001

*Attest:*

*Attesting Officer*

JAMES E. ROGAN
*Director of the United States Patent and Trademark Office*